(12) United States Patent  (10) Patent No.: US 8,381,518 B2
Miller  (45) Date of Patent: Feb. 26, 2013

(54) ENGINE EXHAUST SYSTEM HAVING FILTER BEFORE TURBOCHARGER

(75) Inventor: Michael J. Miller, Mt. Prospect, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 868 days.

(21) Appl. No.: 12/540,096

(22) Filed: Aug. 12, 2009

(65) Prior Publication Data

US 2011/0036087 A1 Feb. 17, 2011

(51) Int. Cl.
*F02B 33/44* (2006.01)
(52) U.S. Cl. .......................... 60/605.2; 60/302
(58) Field of Classification Search ................. 60/605.2, 60/302
See application file for complete search history.

(56) References Cited

U.S. PATENT DOCUMENTS

| | | | |
|---|---|---|---|
| 6,301,888 B1 * | 10/2001 | Gray, Jr. ....................... | 60/605.2 |
| 6,823,660 B2 * | 11/2004 | Minami ......................... | 60/280 |
| 6,945,036 B2 * | 9/2005 | Kato et al. ..................... | 60/302 |
| 6,973,786 B1 | 12/2005 | Liu | |
| 6,981,375 B2 * | 1/2006 | Sisken et al. ................. | 60/605.2 |
| 7,210,469 B1 | 5/2007 | Saele | |
| 7,308,788 B1 | 12/2007 | Das | |
| 7,571,608 B2 * | 8/2009 | Boyapati et al. ............. | 60/605.2 |
| 8,122,717 B2 * | 2/2012 | Joergl et al. .................. | 60/605.2 |
| 8,171,731 B2 * | 5/2012 | Joergl et al. .................. | 60/605.2 |
| 2005/0241302 A1 * | 11/2005 | Weber et al. ................. | 60/605.2 |
| 2007/0175215 A1 * | 8/2007 | Rowells ....................... | 60/605.2 |
| 2010/0071365 A1 * | 3/2010 | Laermann et al. ........... | 60/605.2 |

* cited by examiner

*Primary Examiner* — Mary A Davis
(74) *Attorney, Agent, or Firm* — Mark C. Bach; Jeffrey P. Calfa

(57) ABSTRACT

An engine system for a combustion engine that has an intake manifold and an exhaust manifold has a turbine having a turbine inlet for receiving exhaust gas and a turbine outlet for discharging exhaust gas, and a diesel particulate filter (DPF) having a DPF inlet in flow-communication with the exhaust manifold and a DPF outlet in flow-communication with the turbine inlet. The exhaust at the exhaust manifold has a sufficiently high temperature to maintain passive regeneration of the DPF during normal operating conditions. If the engine system includes an exhaust gas recirculation (EGR) system, the EGR inlet is in flow-communication with the DPF outlet, and an EGR outlet is in flow-communication with the intake manifold. High pressure, high temperature, filtered EGR gas is available for EGR recirculation.

7 Claims, 2 Drawing Sheets

ENGINE EXHAUST SYSTEM HAVING FILTER BEFORE TURBOCHARGER

TECHNICAL FIELD

This invention relates generally to motor vehicles, such as trucks, that are powered by internal combustion engines, particularly diesel engines that have exhaust gas treatment devices, such as diesel particulate filters, and methods of regenerating the same.

BACKGROUND

A known system for treating exhaust gas passing through an exhaust system of a diesel engine comprises a diesel oxidation catalyst (DOC) that oxidizes hydrocarbons (HC) to $CO_2$ and $H_2O$ and converts NO to $NO_2$, and a diesel particulate filter (DPF) that traps diesel particulate matter (DPM). DPM includes soot or carbon, the soluble organic fraction (SOF), and ash (i.e. lube oil additives etc.). The DPF is located downstream of the DOC in the exhaust gas flow. The combination of these two exhaust gas treatment devices prevents significant amounts of pollutants such as hydrocarbons, carbon monoxide, soot, SOF, and ash, from entering the atmosphere. The trapping of DPM by the DPF prevents black smoke from being emitted from a vehicle's exhaust pipe.

A DPF requires regeneration from time to time in order to maintain particulate trapping efficiency. Regeneration involves the presence of conditions that will burn off trapped particulates whose unchecked accumulation would otherwise impair DPF effectiveness. While "regeneration" refers to the general process of burning off DPM, two particular types of regeneration are recognized by those familiar with the regeneration technology as presently being applied to motor vehicle engines.

"Passive regeneration" is generally understood to mean regeneration that can occur anytime that the engine is operating under conditions that burn off DPM without initiating a specific regeneration strategy embodied by algorithms in an engine control system. "Active regeneration" is generally understood to mean regeneration that is initiated intentionally, either by the engine control system on its own initiative or by the driver causing the engine control system to initiate a programmed regeneration strategy, with the goal of elevating temperature of exhaust gases entering the DPF to a range suitable for initiating and maintaining burning of trapped particulates.

The creation of conditions for initiating and continuing active regeneration generally involves elevating the temperature of exhaust gas entering the DPF to a suitably high temperature, such as 500° to 600° C. There are several methods of doing so, such as retarding the start of main fuel injections or post-injection of diesel fuel to elevate exhaust gas temperatures entering the DPF while still leaving excess oxygen for burning the trapped particulate matter. Post-injection of diesel fuel may be used in conjunction with other procedures and/or devices for elevating exhaust gas temperature to the relatively high temperatures needed for active DPF regeneration. One typical method of elevating exhaust gas temperature is by allowing the post-injected diesel fuel to have an exothermic reaction with the oxygen in the DOC, thereby creating the high temperatures needed for regeneration.

As an emission control method, it is known to use exhaust gas recirculation (EGR) to re-circulate exhaust gas back into the cylinders. Exhaust gas recirculation reduces the amount of excess oxygen and lowers the peak combustion temperature of the engine. The EGR gas may be fed through a cooler before it is sent back to the intake manifold.

DPF regeneration methods require extra effort, equipment, and energy. A user or an engine control system must monitor the condition of the DPF in order to initiate the active regeneration. In addition, the engine typically must be fitted with supplemental equipment, such as the apparatus to inject fuel into the exhaust gas. Furthermore, overall efficiency may be reduced because additional fuel must be spent in order to produce heat to burn off the particulates.

The present inventor has recognized the benefit for an engine system that regenerates diesel particulate filters without burning additional fuel, or expending additional effort, or installing additional active generation equipment.

SUMMARY

The exemplary embodiment and method of the present invention include an engine system that includes a diesel particulate filter located between the engine exhaust outlet and a turbine of an engine turbocharger. According to this system, the heat needed for DPF regeneration may come directly from the engine exhaust during normal operation, rather than from an added source of fuel or heat. This should eliminate the need for a device to inject fuel into the exhaust and the need for a DOC to react with the fuel to elevate temperatures in the DPF. This should decrease cost, while increasing engine space and efficiency.

In addition, since the engine exhaust should constantly provide the necessary heat for DPF regeneration, it should not be necessary to define a time for active regeneration. Neither the engine control system nor the driver should have to monitor the state of the DPF if the direct heat from the exhaust is continuously burning off the particulates in the DPF during normal engine operation. What was once active regeneration should become passive regeneration due to the location of the DPF close to the exhaust manifold and upstream of the first turbine.

The engine system should also allow for improved control of EGR gas being re-circulated back into the cylinders. Since the EGR gas is first directed through the DPF, it is clean and therefore may be passed through the compressors before being re-circulated back into the cylinders. The compressed EGR gas and fresh air ensures a well mixed, high pressure homogeneous mixture to be injected into the cylinders. Un-compressed, un-filtered EGR gas need no longer be reintroduced into the intake manifold of the engine. A controlled, homogeneous gas mixture entering the cylinders contributes to a maximum efficiency and/or minimum emissions of the engine.

In addition, since the EGR exhaust gas may be injected pre-compressor, it may be injected into the intake manifold at either, or both, a low pressure (pre-compressor) location and high pressure (post-compressor) location.

The exemplary embodiment of the invention provides an engine system for a combustion engine that has an intake manifold and an exhaust manifold. The engine system includes a turbine having a turbine inlet for receiving exhaust gas and a turbine outlet for discharging exhaust gas; and a diesel particulate filter (DPF) having a DPF inlet in flow-communication with the exhaust manifold and a DPF outlet in flow-communication with the turbine inlet.

Advantageously, the diesel particulate filter can be directly bolted to the exhaust manifold, between the exhaust manifold and the turbine.

If the engine system comprises an exhaust gas recirculation (EGR) system, the embodiment is arranged to have an EGR inlet in flow-communication with the DPF outlet, and an EGR outlet in flow-communication with the intake manifold. In this way, hot filtered EGR gas is available for EGR recirculation.

If turbine is in mechanical communication with a compressor, such as in turbocharging, a compressor outlet is in flow-communication with the intake manifold and a compressor inlet is in flow-communication with fresh air. The EGR outlet can be at least partially in flow-communication with the compressor inlet.

The EGR outlet can be split into a first EGR path and a second EGR path, the first EGR path can be at least partially in flow-communication with the compressor inlet. A second EGR path can be at least partially in flow-communication with a cooler inlet of a compressed air cooler, bypassing the compressor.

One or more control valves can be provided in at least one of the first and second EGR paths, the control valve or valves being adjustable to control the proportion of EGR flow between the first and second EGR paths, and/or control the amount of EGR flow in each of the first and second EGR paths.

An exemplary method of exhaust gas conditioning and control is provided by the invention which includes the steps of:
filtering exhaust gas discharged from the exhaust manifold by a diesel particulate filter (DPF) and discharging filtered exhaust gas from the DPF; and
directing a first portion of the filtered exhaust gas into a turbine to generate rotational energy from the turbine.

The method can also include the step of directing a second portion of the filtered exhaust gas from upstream of the turbine to an exhaust gas recirculation (EGR) path, wherein the EGR path directs the second portion to the intake manifold of the engine.

The method can also include the sub-steps of a first sub-portion of the second portion to the compressor for compression with fresh air and directing a second sub-portion of the second portion to the intake manifold, bypassing the compressor.

The method can be further defined in that the first and second sub-portions are controlled in relative proportion or amounts according to engine operating parameters.

Numerous other advantages and features of the present invention will be become readily apparent from the following detailed description of the invention and the embodiments thereof, from the claims and from the accompanying drawings.

DETAILED DESCRIPTION

Figure 1:
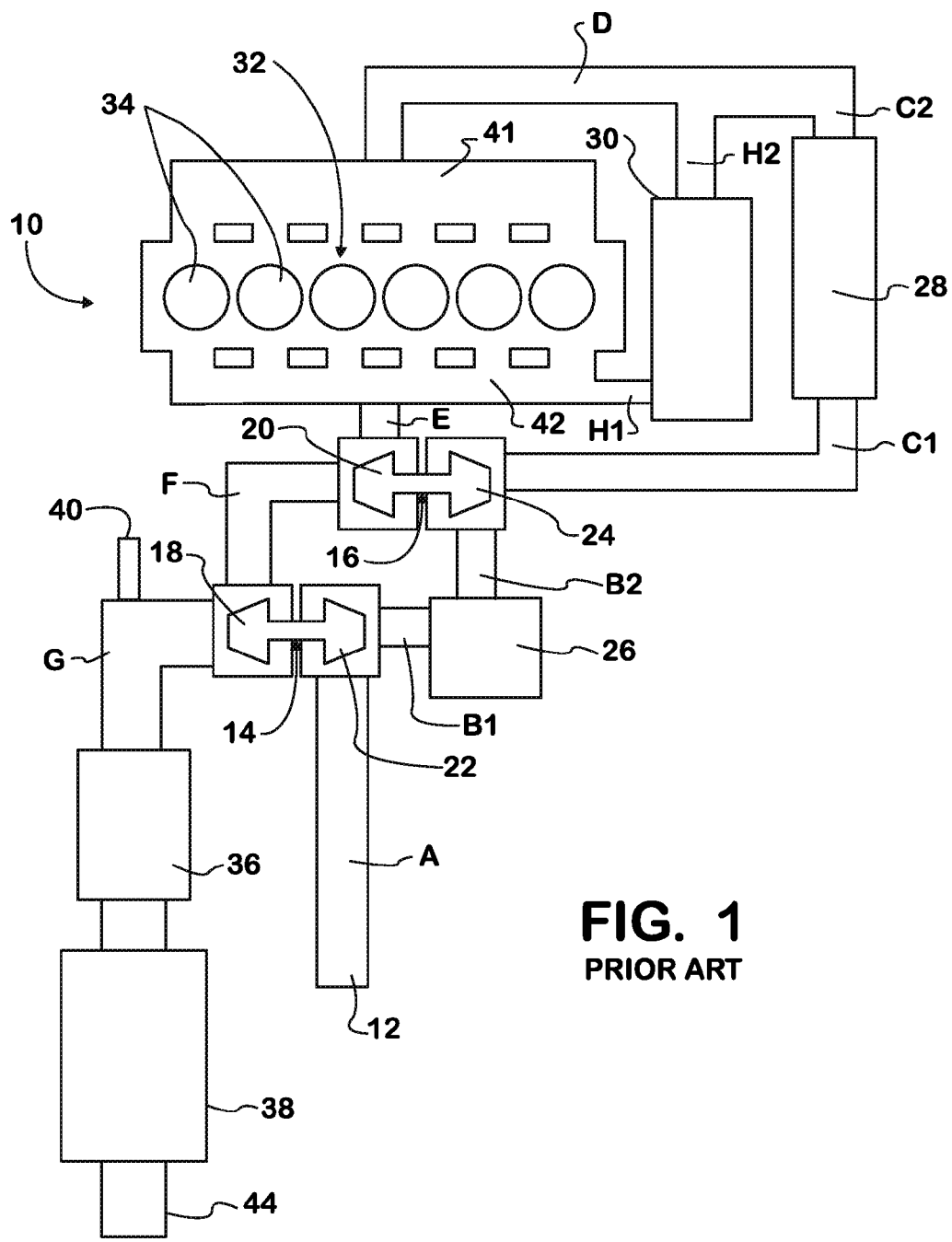
FIG. 1 is a schematic view of a prior art engine system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a prior art engine system 10. This prior system includes an air inlet 12, first and second stage turbochargers 14 and 16, an interstage cooler 26 and a compressed air cooler 28. Turbochargers 14 and 16 include turbines 18 and 20, respectively. Turbochargers 14 and 16 also include compressors 22 and 24, respectively. The engine system further comprises an EGR cooler 30.

FIG. 1 also shows engine block 32. Engine block 32 contains cylinders 34. In addition, prior engine system 10 also comprises a diesel oxidation catalyst (DOC) housing 36, a diesel particulate filter (DPF) 38, and an exhaust diesel fuel injector 40.

In this prior art system 10, air enters through air inlet 12, such as through an air filter (not shown) and passes through passage A to the compressor 22. The air exits compressor 22 through passage B1, passes through the interstage cooler 26, through passage B2 and enters the compressor 24. The air exits the compressor 24 through a passage C1, passes through the compressed air cooler 28, through passage C2, and enters an intake manifold 41 via a passage D. This air then enters the cylinders 34 and becomes part of the combustion process.

The exhaust gas exiting cylinders 34 passes through an exhaust gas manifold 42 and exits therefrom through two passageways, E and H1. The exhaust passing through passage H1 passes through EGR cooler 30, through a passage H2, enters the passage D, and mixes with the air from passage C2 and passes to the manifold 41.

The exhaust gas passing through passage E first passes through turbine 20, spinning the turbine and then enters turbine 18 by way of passage F. Exhaust gas from the turbine 18 enters passage G and passes into the DOC housing 36. Some pollutants in the exhaust are chemically converted, and then the exhaust gas passes into and through the DPF 38, which traps some diesel particulates. The exhaust gas then exits through engine outlet pipe 44. A muffler or other exhaust gas treatment can be connected to the outlet pipe 44.

During active regeneration, diesel fuel is injected from exhaust diesel injector 40 into the DOC housing 36 so heat may be generated in order to burn diesel particulates off the DPF.

Figure 2:
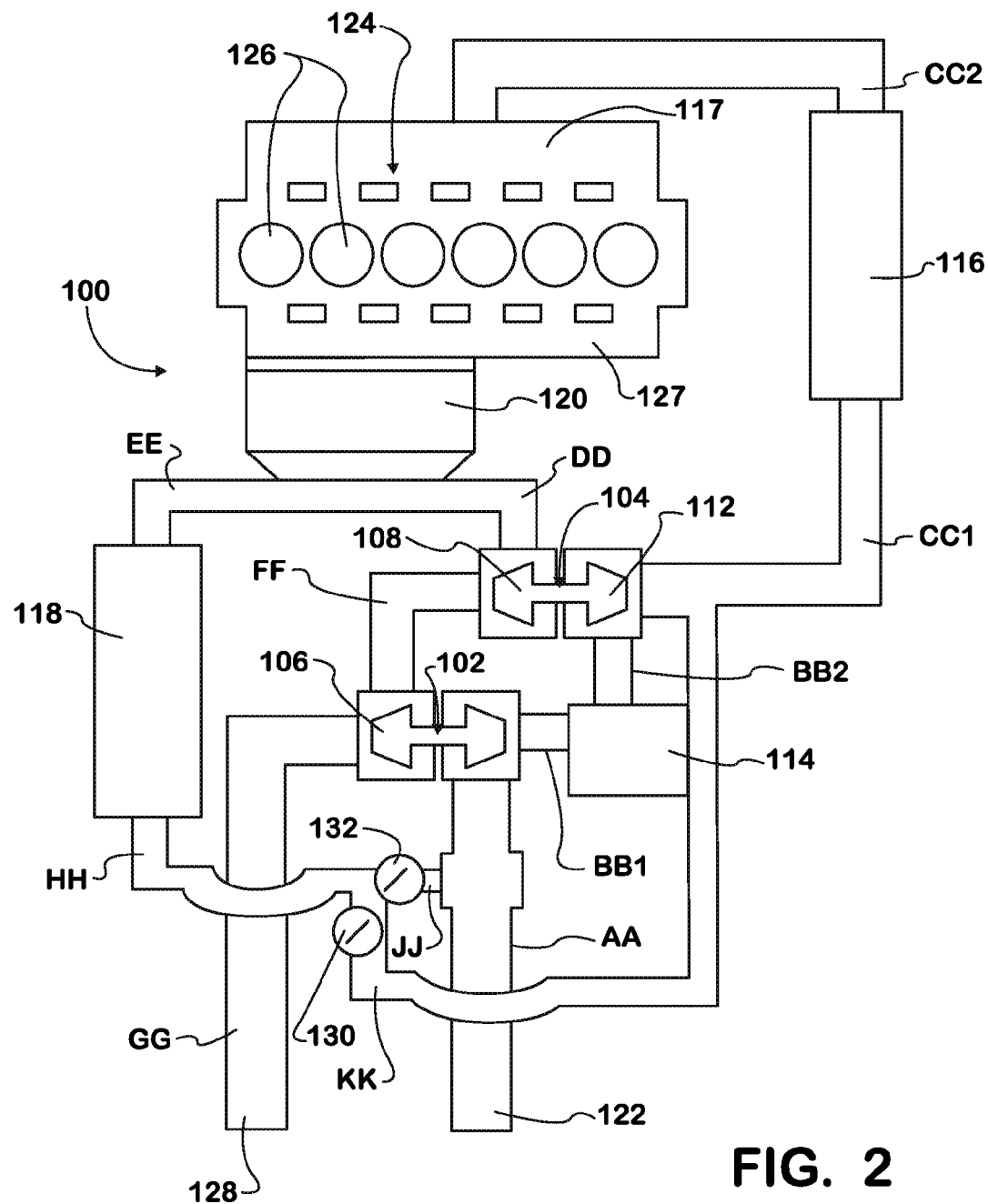
FIG. 2 is a schematic view of the engine system of an exemplary embodiment of the present invention.

FIG. 2 shows an exemplary embodiment of the present invention. A number of differences are demonstrated between this new embodiment and the prior art system of FIG. 1.

The engine system 100 comprises first and second stage turbochargers 102 and 104, an interstage cooler 114 and a compressed air cooler 116. Turbochargers 102 and 104 contain turbines 106 and 108, respectively. Turbochargers 102 and 104 also contain compressors 110 and 112, respectively. Engine system 100 also includes an EGR cooler 118, and a DPF 120.

Fresh air enters the engine through an air inlet 122. This fresh air passes through passage AA to the first compressor 110. Here, the air is compressed, and discharged through passage BB1. The air passes through the interstage cooler 114 and enters second compressor 112 by way of passage BB2. The air, compressed further, exits second compressor 112 through passage CC1, passes through the compressed air cooler 116, and enters an intake manifold 117 by way of passage CC2. This air enters cylinders 126 of the engine block 124, via valves (not shown) for combustion.

During the ongoing combustion process, exhaust gas is expelled out of the cylinders 126 through valves (not shown) and into an exhaust manifold 127. This exhaust gas immediately passes through the DPF 120 and is split into two passages, DD and EE. The exhaust gas entering passage DD passes through turbine 108, supplying rotational energy to compressor 112. The exhaust gas then travels through passage FF and through turbine 106, supplying rotational energy to compressor 110, and exits the engine system 100 through passage GG and through an engine outlet path 128.

The exhaust that flows through passage EE follows a different path. After exiting the DPF 120, it flows through passage EE and through the EGR cooler 118. When the exhaust exits the EGR cooler 118, it enters into passage HH, which splits into passages KK and JJ. The flow of the exhaust through passages KK and JJ may be controlled with the use of one or more control valves 130 and 132 within the branches, respectively. The relative proportion of EGR flow between the two branches KK and JJ can be controlled and/or the amount of flow in each branch KK and JJ can be controlled. It is possible that only one control valve in one branch could be provided to control the balance between he two branches KK and LL.

The exhaust that flows into and through passage KK will meet with the air exiting compressor 112 in passage CC. It will then go on to join the air in being inserted into the cylinders 126.

The exhaust that flows into passage JJ is injected into passage AA and mixes with fresh air from engine inlet 122. This causes the exhaust gas to be compressed along with the fresh air, to form a high pressure homogeneous mixture to follow passages FF, CC1, CC2 until the mixture is injected into the cylinders 126. With the use of control valves 130 and 132, the choice between a pre-compressor mixture or post-compressor mixture of air and exhaust can be chosen as desired, depending on engine operating conditions.

According to an exemplary embodiment of the present invention, the location at which DPF regeneration occurs is substantially adjacent to the engine block 124, such as mounted to the exhaust manifold 127. Therefore, no DOC housing or exhaust diesel injector (36 and 40 from FIG. 1, respectively) need be used in the process of DPF regeneration. During normal operation of the cylinders 126, the exhaust gas temperature at the engine block 124 should be sufficiently high to produce passive regeneration, so the DPF 120 will be in a substantially constant state of regeneration, rather than be subjected to intermittent regeneration cycles.

According to the exemplary embodiment, the DPF 120 can be bolted directly to the exhaust manifold 127. To prevent undue exhaust gas pressure drop upstream of the turbine 108, the DPF can have a large cross-sectional flow area.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An engine system for a combustion engine having an intake manifold and an exhaust manifold, comprising:
   a turbine having a turbine inlet for receiving exhaust gas and a turbine outlet for discharging exhaust gas;
   a diesel particulate filter (DPF) having a DPF inlet in flow-communication with the exhaust manifold and a DPF outlet in flow-communication with the turbine inlet,
   wherein the engine system comprises an exhaust gas recirculation (EGR) path having an EGR inlet in flow-communication with the DPF outlet, and an EGR outlet in flow-communication with the intake manifold, wherein the turbine is in mechanical communication with a compressor, the compressor having a compressor outlet in flow-communication with the intake manifold and a compressor inlet in flow-communication with fresh air, wherein the EGR outlet is split into a first EGR path and a second EGR path, the first EGR path is at least partially in flow-communication with the compressor inlet, and further comprising a compressed air cooler having a cooler inlet in flow-communication with the compressor outlet, and a cooler outlet in flow-communication with the intake manifold, and wherein the second EGR path is at least partially in flow-communication with the cooler inlet, bypassing the compressor inlet.

2. The engine system according to claim 1, wherein the diesel particulate filter is bolted to the exhaust manifold.

3. The engine system according to claim 1, wherein a control valve is arranged in at least one of the first and second EGR paths, the control valve adjustable to control the proportion of EGR gas flow between the first and second EGR paths.

4. The engine system according to claim 1, wherein a first control valve is arranged in the first EGR path and a second control valve is arranged in the second EGR path, the first and second control valves being adjustable to control the EGR gas flow in the first and second EGR paths.

5. The engine system according to claim 4, wherein the diesel particulate filter is bolted to the exhaust manifold.

6. A method of filtering diesel particulates discharged from an exhaust manifold of a diesel engine, comprising the steps of:
   filtering exhaust gas discharged from the exhaust manifold by a diesel particulate filter (DPF) and discharging filtered exhaust gas from the DPF;
   directing a first portion of the filtered exhaust gas into a turbine to generate rotational energy from the turbine, wherein the diesel engine comprises an intake manifold and a compressed air cooler,
   directing a second portion of the filtered exhaust gas from upstream of the turbine to an exhaust gas recirculation (EGR) path, wherein the EGR path directs the second portion to the intake manifold of the engine,
   the further step of using the rotational energy from the turbine to drive a compressor that compresses fresh air to be directed to the intake manifold for combustion,
   cooling the compressed fresh air with the compressed air cooler to then be directed to the intake manifold, and
   wherein the step of directing the second portion is further defined in that a first sub-portion of the second portion is directed to an inlet of the compressor for compression with fresh air and a second sub-portion of the second portion is directed to the cooler, bypassing the compressor.

7. The method according to claim 6, wherein the step of directing is further defined in that the first and second sub-portions are controlled in relative proportion according to engine operating parameters.

* * * * *